Figure 1:
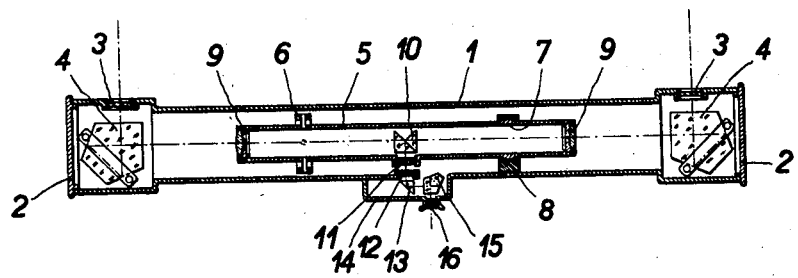

April 30, 1935.   O. EPPENSTEIN   1,999,833

SELF CONTAINED BASE RANGEFINDER

Filed June 12, 1934

Inventor:
Otto Eppenstein

Patented Apr. 30, 1935

1,999,833

UNITED STATES PATENT OFFICE 1,999,833

SELF-CONTAINED BASE RANGEFINDER

Otto Eppenstein, Jena, Germany, assignor to the firm of Carl Zeiss, Jena, Germany Application June 12, 1934, Serial No. 730,240
In Germany June 16, 1933, 1 Claim. (Cl. 88—2.6)

The present invention relates to self-contained base rangefinders (for which I have filed an application in Germany, June 16, 1933) of which the following is a specification:

Measurements effected with the usual coincidence rangefinders will be correct only so long as the position of the ray combining system relative to the line interconnecting the rear principal points of the objective systems remains constant with respect to that position which is assumed when the adjustment of the rangefinder was effected. To avoid any such alterations of position also when the rangefinder is unilaterally exposed to the sun, and to prevent the exterior housing of the rangefinder from being bent on account thereof, the objectives and the ray combining system are generally disposed in a special support, namely, an interior tubular housing, which is so connected to the exterior housing that it does not suffer a bending to which this exterior housing may be exposed, the exterior housing containing only the eye-piece or part of same. This construction may be used for all kinds of self-contained base rangefinders, for instance for stereoscopical rangefinders, in which at least part of the ocular systems is attached to the exterior housing and in which all other optical parts of the telescope system are supported by an interior tubular housing. On account of the said construction, there may arise only such displacements of the interior housing relative to the exterior housing as may not entail any systematical measuring errors but which, on the other hand, make the measurements more difficult because they produce axial or radial displacements of the ocular systems relative to the image planes of these systems. Displacements of this kind are to be feared especially when the different parts of the exterior housing of rangefinders having a long base are exposed very much to different temperatures, these displacements being even greater when the rangefinder is provided in the known manner with an interior housing surrounded by another interior housing representing the support of the angular reflecting systems which direct the rays to the objectives.

The invention aims at avoiding the said inconveniences by so constructing the rangefinder that the pencils of rays emanating from different points of the image plane of the objective are pencils of parallel rays when they leave the interior housing. To this end, use is made, for instance, not of one of the usual eye-pieces representing magnifying glasses but of a terrestrial eye-piece the reversing system or which consists of two converging members of equal or different focal lengths attached to the interior and the exterior housing, respectively. When the rangefinder has one of the usual image-reversing eye-pieces, the said inconveniences may be overcome by providing in the path of the imaging rays in the two housings a converging and a diverging member, respectively, which do not effect any reversal of the images. The use of one of the said systems entails that the reciprocal displacements of the housings do not produce any influence upon the position and the sharpness of the image in the eye-piece.

Figure 2:
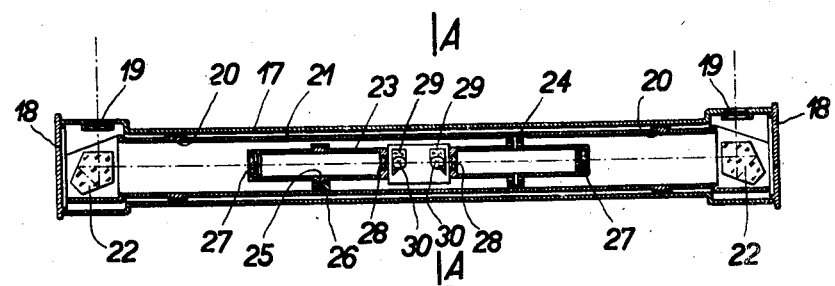
Figure 3:
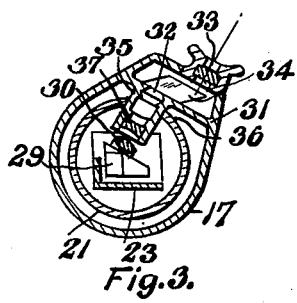

In the accompanying drawing, which illustrates the invention, Figures 1 and 2 represents two constructional examples, viz. a coincidence rangefinder and a stereoscopical rangefinder, respectively, in plan views from above. Figure 3 shows a section through line A—A in Figure 2. In these figures, only those parts are reproduced which are required for making the invention intelligible, the rangefinding device proper, which may be of any kind, having been omitted.

The first constructional example (Figure 1) has an exterior tube 1 whose two ends are closed by covers 2. Behind windows 3, which are traversed by the imaging rays, are provided angular reflecting prisms 4 that deviate the said rays in the direction of the rangefinder base. In the exterior tube 1 is disposed an interior tube 5 which rests in a cardanic bearing 6 and has a spherical part 7 lying in a sleeve 8 fixed to the exterior tube 1. The ends and the middle of the interior tube are provided with objectives 9 and a ray combining prism 10, respectively. Opposite this prism 10 is a converging lens 11, which is mounted in the wall of the interior tube 5 and coordinated to a lens 12 and a rectangular isosceles prism 13. The lens 12 and the prism 13 are co-axial to the lens 11 and covered by a housing 14 fused to the exterior tube 1 and containing a pentagonal prism 15 and an ocular lens 16.

The imaging rays emanating from an object point at a great distance traverse the windows 3 as parallel rays and enter the angular reflecting prisms 4 that direct them to the objectives 9 by means of which they are converged at image points lying in the rear focal plane of these objectives 9. The lens 11 is given such a focal length that, considering the deviation in the ray combining prism 10, its front focal plane coincides with the said focal planes of the objectives 9. The pencils of imaging rays emanating from the image points consequently leave the lens 11 as pencils of parallel rays, and they are converged to image points by the lens 12 in the rear focal plane of this lens. Considering the effect of the deviating prisms 13 and 15, the front focal plane of the ocular lens 16 coincides with the rear focal plane of the lens 12. As the pencils of imaging rays between the last and the first optical members, viz. the lenses 11 and 12, which are connected to the interior tube 5 and to the exterior tube 1, respectively, consist of parallel rays, bendings of the exterior tube 1 and displacements relative to the interior tube 5 may not influence the position and sharpness of object images in the ocular focal plane.

The stereoscopical rangefinder representing the second construction example (Figures 2 and 3) has an exterior tube 17 whose ends are provided with covers 18 and which has windows 19 for the entering rays. By means of two spherical parts 20, a tube 21 is mounted in the exterior tube 17, this tube 21 supporting two angular reflecting prisms 22 and containing the interior tube proper, which is designated 23. The interior tube 23 is attached to the tube 21 by means of a cardanic bearing 24 and a spherical part 25 in a sleeve 26. The ends of the interior tube 23 contain objectives 27 having converging lenses 28 in their rear focal planes. The lenses 28 may be provided with the elements of the stereoscopical mark required for rangefinding. Behind these converging lenses 28, the interior tube 23 contains deviating prisms 29 each of which has a converging lens 30. Opposite the prisms 29, the exterior tube 17 has a housing 31 containing prisms 34 and two eye-pieces each of which consists of a reversing lens 32 and an eye-lens 33.

The housing 31 has two parts 35 which extend through apertures 36 into the tube 21 and represent mounts for diverging lenses 37 placed in front of the eye-pieces 32, 33.

The rear focal planes of the objectives 27 coincide with the front focal planes of the lenses 30. The foci of the lenses 37 are imaged in the focal planes of the eye-lenses 33 by means of the reversing lenses 32. Obviously, the paths of the imaging rays emanating from a point at a great distance are parallel between the last optical members connected to the interior tube 23, viz. the lenses 30, and the first optical members attached to the exterior tube 17, viz. the lenses 37, as a consequence of which any bendings of the exterior tube 17 and displacements of the interior tube 23 relative to the exterior tube 17 may not influence the positions and the sharpness of the object point images in the ocular image planes.

I claim:

A self-contained base rangefinder consisting of an exterior tubular housing, at least one interior tubular housing, two reflecting systems for deviating the pencils of imaging rays, and a telescope system containing two objective systems and at least one prism system and one eye-piece system, part of the said eye-piece system being disposed in the said exterior housing, the remaining optical parts of the said telescope system being disposed in the said interior housing, and the front focus of that optical part of the eye-piece system which is disposed in the said interior housing coinciding with the rear focus of at least one of the said objective systems.

OTTO EPPENSTEIN.